United States Patent [19]
Richmond

[11] 3,831,318
[45] Aug. 27, 1974

[54] EXPLOSION DETECTION AND SUPPRESSION METHOD AND APPARATUS

[75] Inventor: J. Kenneth Richmond, Pittsburgh, Pa.

[73] Assignee: Rocket Research Corporation, Redmond, Wash.

[22] Filed: May 8, 1972

[21] Appl. No.: 251,079

[52] U.S. Cl............................. 49/31, 49/34, 49/68, 169/2 R, 340/228 R
[51] Int. Cl............................................. E05f 15/20
[58] Field of Search............ 109/1; 169/1 R, 2 R, 4; 114/68, 34; 49/31, 68; 160/41; 340/228 R

[56] References Cited
UNITED STATES PATENTS

| | | | |
|---|---|---|---|
| 1,261,924 | 4/1918 | Grasty et al. | 49/31 X |
| 1,293,918 | 2/1919 | Priolo | 114/68 |
| 1,320,012 | 10/1919 | Lee et al. | 114/68 |
| 1,806,859 | 5/1931 | Mattei | 160/41 UX |
| 1,873,161 | 8/1932 | Taucher | 169/2 R |
| 2,352,378 | 6/1944 | Geertz | 169/2 R |
| 2,403,806 | 7/1946 | Langdon | 114/68 |
| 2,869,647 | 1/1959 | Mathisen | 169/4 |
| 3,156,908 | 11/1964 | Kopan et al. | 169/1 R X |
| 3,241,617 | 3/1966 | Jamison | 169/2 R X |
| 3,563,036 | 2/1971 | Smith et al. | 61/1 F |
| 3,645,337 | 2/1972 | Livingston | 169/1 R X |

*Primary Examiner*—Dennis L. Taylor
*Attorney, Agent, or Firm*—Graybeal, Barnard, Uhlir & Hughes

[57] ABSTRACT

In a coal mine passage, a plurality of stored bags which can be rapidly inflated with an inflating medium having a combustion suppressing agent to form a barrier to the propagation of a combustion reaction of a fuel-air mixture, such as a mixture of coal dust and/or methane and air. To detect an incipient propagating combustion reaction, there is a radiation sensor, a static pressure sensor and a dynamic pressure sensor. There is a data analysis computer comprising a discriminator which determines a condition where radiation is above a certain predetermined level, and static and dynamic pressure are below a predetermined level within an initial short time period (e.g. 0.15 seconds) of sensing such increased radiation. When such a condition exists, the discriminating means arms an activating means which inflates the barrier bags in response to a predetermined level of increase of any one of the following five values: static pressure, dynamic pressure, rate of dynamic air pressure increase, rate of static pressure increase, and rate of radiation increase. Thus the apparatus discriminates between an actual condition of a possible rapidly propagating combustion reaction and such other disturbances as a stationary flame, electrical spark or a blast wave that do not result in such reaction. By initially containing the combustion suppressing medium in an inflatable, a more effective barrier is formed.

20 Claims, 5 Drawing Figures

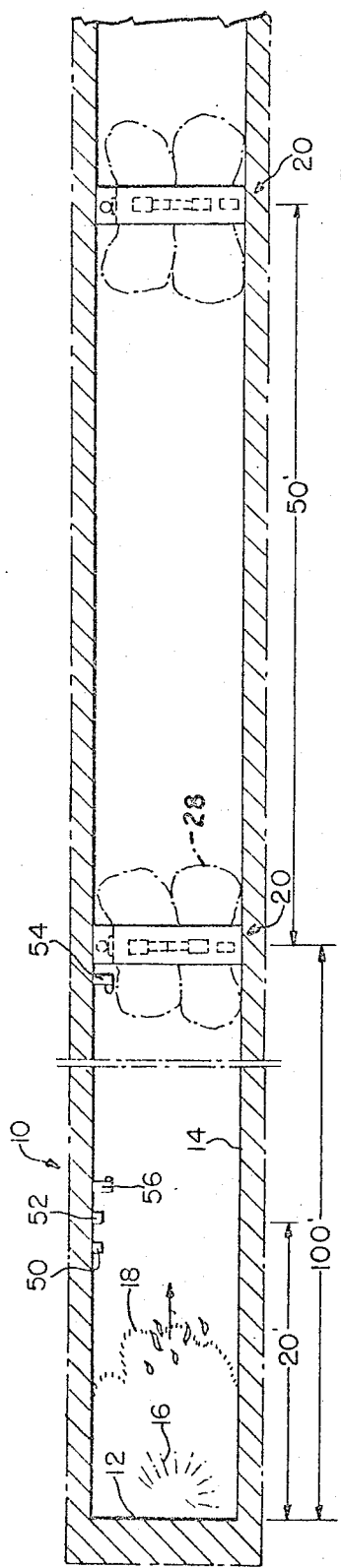
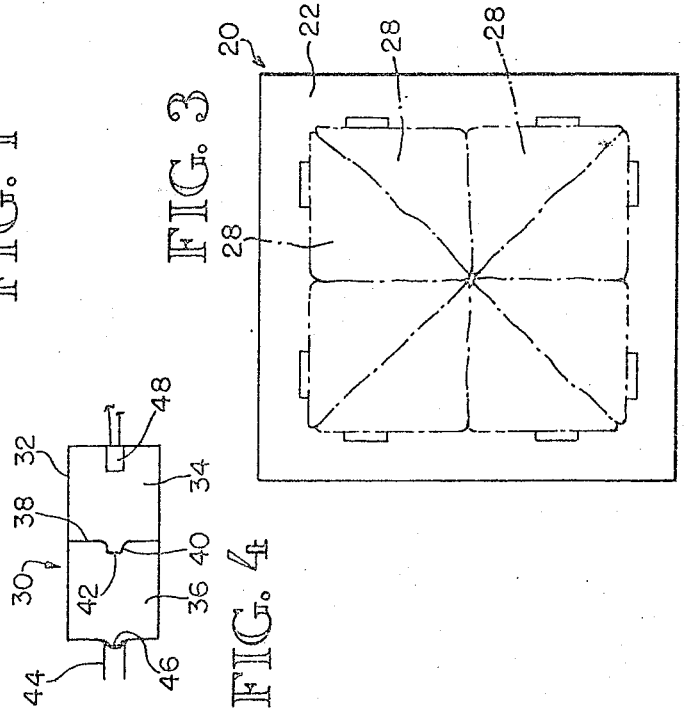
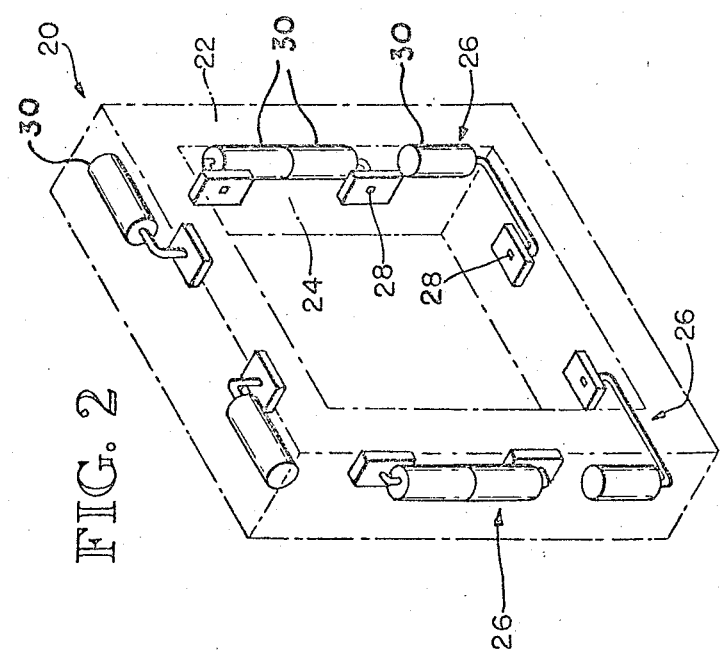

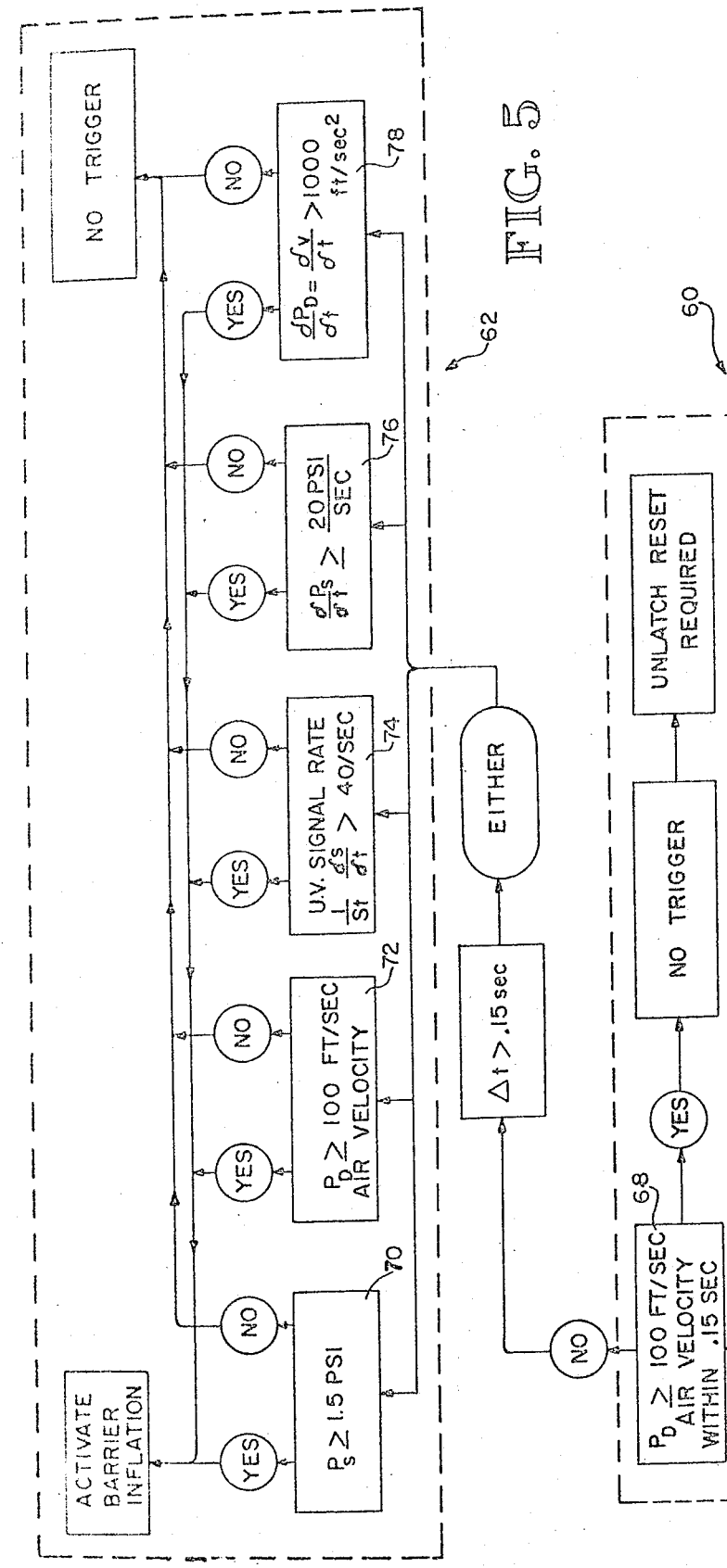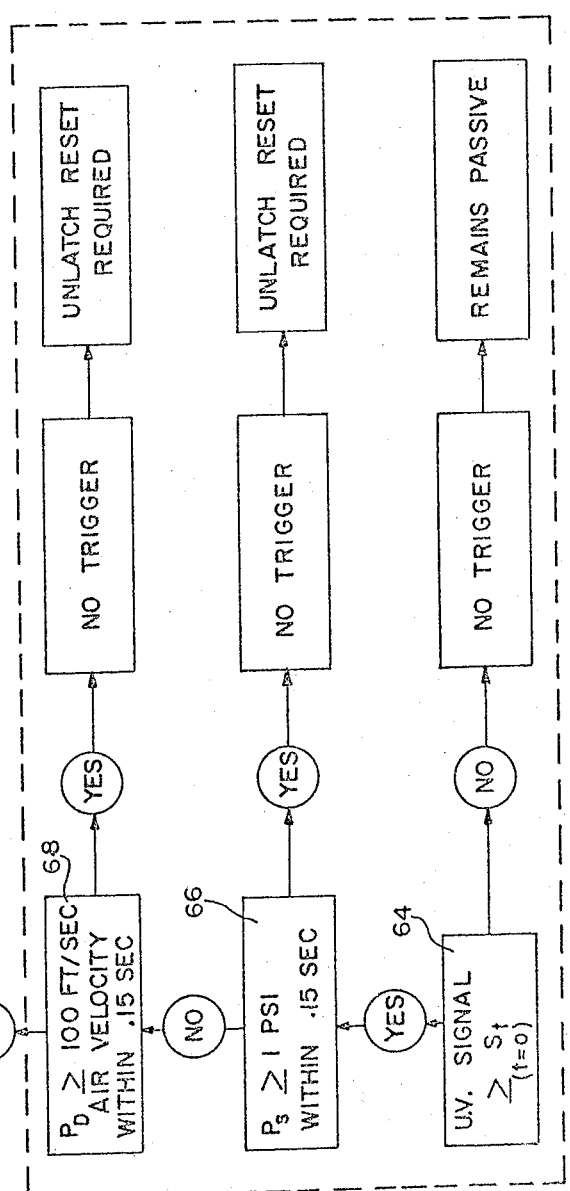
FIG. 5

EXPLOSION DETECTION AND SUPPRESSION METHOD AND APPARATUS

BACKGROUND OF THE INVENTION

1. Field of the Invention

The present invention relates to the suppression of a propagating explosive-like combustion reaction, such as occurs in a coal mine or the like.

2. Description of the Prior Art

In many industrial situations, such as underground coal mines, refineries, chemical plants, flour mills and grain elevators, there sometimes occur accumulations of combustible gas, vapor or dust, which can be the source of a rapidly propagating combustion reaction when present in the air within certain ranges of concentration. Ignition of such fuel-air mixtures can occur, for example, from a spark caused by operating machinery. When the fuel-air mixture is confined, such as in a coal mine passageway, the initial combustion in a short time becomes a rapidly propagating explosive-like combustion reaction that travels with increasing speed through the confined area.

The following patents are representative of the prior art attempts to suppress such explosive-like reactions.

Geertz, U.S. Pat. No. 2,352,378 discloses the formation of a flame barrier in a mine by spraying into the mine passageway a combination of a carbon dioxide "snow" and rock dust.

Glendinning et al, U.S. Pat. No. 2,693,240 detects an incipient explosive reaction by detecting a rate of static pressure increase above a predetermined level.

Mathisen, U.S. Pat. No. 2,869,647 discloses an apparatus for detecting and suppressing explosions, in which there is a radiation detector responding to certain frequencies of radiation, and a liquid suppressant distributor having electrically ignitable explosive means for projecting the liquid.

Kopan et al, U.S. Pat. No. 3,156,908, discloses particular circuitry for detecting a flame.

Mitchell et al, U.S. Pat. No. 3,482,637 and Jamison, U.S. Pat. No. 3,515,217 disclose exploding fire suppressing material (e.g. alkali metal carbonates) as a means of suppressing a gas-air explosion.

One of the problems with such prior art systems is the too frequent occurence of the system reacting to false alarms because of the inability to discriminate between what is an actual condition of a possible rapidly propagating combustion reaction of an air-fuel mixture and other disturbances that do not result in such a combustion reaction, such as a stationary flame, an electric spark (caused possibly by operating machinery) or a blast wave (resulting, for example, from an explosion deliberately initiated). Another problem in the prior art is that of deploying a combustion suppressing material so that it provides an effective barrier to the propagating reaction. Since the actual reaction front is usually preceded by a pressure wave, there is a tendency for the suppressing agent to be blown away from the reaction front so as to degrade its suppressing action.

SUMMARY OF THE INVENTION

The present invention relates to a method and apparatus of detecting and suppressing propagation of an explosive-like combustion reaction of a fuel-air mixture (e.g. coal dust and/or methane and air) in a confined area, such as a coal mine. The explosive reaction is suppressed by deploying confinement means (such as a plurality of inflatable bags) into a position blocking the propagating path of the reaction. The confinement means is inflated by a medium comprising a combustion suppressing agent, such as an atomized halocarbon (e.g. Freon). The confinement comprises a surface material that is readily deteriorable, desirably from the heat of the combustion reaction, so that the combustion suppressing agent becomes exposed to the advancing combustion reaction to suppress the same. The confinement contains the suppressing agent so that it can properly perform its combustion suppressing function. Without this confinement, the suppressing agent would tend to be blown ahead by the rapid air movement and blast wave created by the combustion wave.

To detect incipient propagation of the combustion reaction, there is radiation sensing means (desirably an ultraviolet sensor) and pressure sensing means (desirably both a static air pressure sensor and a dynamic air pressure sensor). When there is a condition of radiation above a predetermined level combined with no pressure increase above a predetermined level (e.g. 1.0 psi static pressure and dynamic pressure indicating air velocity no greater than 100 feet per second) within a short time increment (e.g. 0.15 seconds) after detection of radiation, discriminating means responsive to the sensors determines this condition and sends an arming signal to an inflation activating means. This inflation activating means is responsive to an increase above a predetermined level of at least one, and desirably any one of the following five factors: static air pressure, dynamic air pressure, rate of change of static air pressure, rate of change of dynamic air pressure, and rate of change of radiation. When there is such response to one of these five factors, inflation of the bags is initiated to suppress propagation of the explosive reaction.

BRIEF DESCRIPTION OF THE DRAWINGS

FIG. 1 is a semi-schematic longitudinal sectional view of a coal mine shaft in which the present invention is incorporated;

FIG. 2 is an isometric view of a single suppressor station of the present invention;

FIG. 3 is a front elevational view of the suppressor station of FIG. 2 with the barrier bags thereof in the inflated condition;

FIG. 4 is a sectional view of an inflating means suitable for use in the present invention; and FIG. 5 is a schematic drawing illustrating the detecting apparatus of the present invention.

DESCRIPTION OF THE PREFERRED EMBODIMENT

FIG. 1 is a semi-schematic drawing of coal mine shaft 10 having a front face 12 and a confined passageway 14 extending rearwardly therefrom. It sometimes occurs that either because of suspended coal dust or methane gas leaking from the coal formation, that there is a combustible fuel-air mixture in the shaft 10. When there is ignition of such a fuel-air mixture, it will quite often occur near the front face 12 of the mine because of sparks or other ignition sources from operating machinery near the face 12. When there is such an ignition, there is usually an initial localized combustion reaction (indicated at 16), which then propagates into an explosive-like reaction (indicated at 18) that travels with rapidly increasing speed down the confined passageway 14.

To suppress such a propagating explosive-like reaction, there are provided at spaced locations along the mine passageway 14 (e.g. every 50 feet) a plurality of suppressor stations 20 with the forwardmost station being about 100 feet from the face 12. These suppressor stations are moved to their proper locations along the mine shaft as the coal face is advanced, thereby protecting the remainder of the mine. Each suppressor station 20 comprises a peripheral frame 22 fitting against the side walls of the passageway 14 and having a large center opening 24 to permit the usual activities of a mining operation. Mounted within the frame 22 are a plurality of inflating units 26, each of which comprises a collapsed confinement 28 (i.e. an inflatable barrier bag) in stowed position and an associated inflating gas source 30. (As shown herein, there are eight such inflating units 26, placed two on the top of the frame 22, two in the bottom, and two on each side.) When the bags 28 are inflated to their full inflated position (as shown in FIG. 3 and indicated in broken lines in FIG. 1), the bags 28 completely block the passageway 14 and extend lengthwise in the passageway 14 a distance at least approximately equal to the width of the passageway 14.

One of the inflating gas sources 30 is shown semischematically in FIG. 4. Such a device 30 comprises a housing 32 defining a rear gas producing chamber 34 and a forward suppressant containing chamber 36. The chamber 34 can contain a quantity of compressed gas or a propellant-type composition which upon ignition generates combustion gas products at a relatively rapid rate. The forward chamber 36 contains a suitable combustion suppressing agent, such as a vaporizable liquid coolant (e.g. a suitable liquid halocarbon, such as those known by the name "Freon"). The chambers 34 and 36 are divided by a partition plate 38 having a center nozzle 40 closed by a burst disc 42. The forward chamber 36 has a front tubular opening closed by a second burst disc 46, the tube 44 leading to its respective inflatable barrier bag 28.

In the gas producing chamber 34 is an igniter 48 or other activating means, which causes the burst diaphragms 42 and 46 to rupture so that gas flows from the chamber 34 through the nozzle 40 into and through the coolant chamber 36 and the tube 44 to inflate its related bag 28. The flow of gas from the chamber 34 atomizes or vaporizes the liquid suppressant in the chamber 36, so that there is delivered into its related inflatable bag 28 an inflating gas mixture made up of the primary gas from the chamber 34 and the vaporized and/or atomized suppressant agents from the chamber 36. The bags 28 are made of a material that is readily deteriorable, desirably from heat, so that the heat from the combustion reaction causes the suppressing agent dispersed in the bags 28 to become exposed to the combustion reaction.

To detect incipient propagation of the explosivelike reaction, there is positioned a short distance rearwardly (e.g. 20 feet) of the front face 12 of the mine 10 a static pressure sensor 50 and a dynamic air pressure sensor 52, the sensor 52 being arranged to sense air velocity in a direction generally rearwardly from the front face 12. Further rearwardly of the sensors 50 and 52 is a radiation sensor 54 responsive to ultraviolet radiation emanating from a location in the area at or near the front face 12 of the mine 10. A calibration lamp 56 is provided to direct a calibrating signal to the sensor 54 so that allowance can be made for such variables as, for example, coal dust collecting on the sensor 54.

In FIG. 5 is shown schematically the discriminating and activating apparatus by which a situation of an incipient propagating explosive-like reaction is ascertained and the inflators are activated. Such an apparatus is desirably in the form of a high speed data analysis computer, the logic diagram of which is illustrated in FIG. 5. This apparatus has two basic parts: (a) initial discriminating and arming means 60, and (b) final discriminating and activating means 62.

The initial discriminating and arming means 60 comprises an ultraviolet discriminator 64 which responds to the sensor 54 detecting ultraviolet radiation above a predetermined threshold level to initiate a timing signal. This timing signal is transmitted to both a static pressure and time gate discriminator 66 and a dynamic pressure and time gate discriminator 68.

If within a predetermined time (e.g. 0.15 seconds) the static pressure discriminator 66 receives an input from the static pressure sensor 50 that indicates a rise in static pressure above a predetermined level (e.g. 1 psi), it transmits a "yes" signal to inactivate the system. Likewise, if the dynamic pressure discriminator 68 detects from the dynamic pressure sensor 52 a dynamic pressure equivalent to an air velocity equal to or above, for example, 100 feet per second within, for example, 0.15 seconds, it also transmits a "yes" signal, which results in inactivating the system. On the other hand, if both the discriminators 66 and 68 receive inputs indicating no static or dynamic pressures above those levels, a no signal is transmitted to arm the final discriminating and activating means 62. By this preliminary sorting of data, the initial discriminating and arming means has discriminated against a non-igniting blast wave, preceded by a spark.

The final discriminating and activating means 62 comprises five discriminators: a static pressure discriminator 70, a dynamic pressure discriminator 72, an ultraviolet rate of change discriminator 74, a static pressure rate of change discriminator 76, and a dynamic pressure rate of change discriminator 78. After the discriminating and activating means 62 is armed, if any one of the discriminators 70 through 78 ascertains a related value above a predetermined level, it activates the barrier inflation apparatus. That is to say, if, for example, the static pressure discriminator 70 detects a static pressure above 1.5 pounds per square inch, it will activate the barrier inflation system, even though the other discriminators 72 and 78 have not ascertained values above their threshold level of activation. The particular threshold levels for each of the discriminators 70 through 78 will vary, of course, depending upon the particular conditions, so the threshold values indicated on the drawing of FIG. 5 are merely by way of example.

To describe the operation of the present invention, let it be assumed that there is in the coal mine 10 a combustible fuel-air mixture (methane and/or coal dust with air), and that combustion has been initiated in the form of a small fire ball (as at 16) near the front face 12 of the mine 10. The ultraviolet sensor 54 is so calibrated that the ultraviolet light from the fire ball 16 would be above the threshold level at which the ultraviolet discriminator 64 is set to respond. Immediately upon being activated from the sensor 54, the ultraviolet discriminator 64 initiates a timing signal to the static pressure discriminator 66 and the dynamic pressure discriminator 68.

If the source of the ultraviolet signal were an explosion deliberately set off, for example, to break up a formation, there would immediately be a pressure wave traveling down the passageway 14, so that either or both of the static pressure sensor 50 and the dynamic pressure sensor 52 would experience a pressure increase above their respective threshold levels within the predetermined time period (e.g. 0.15 seconds). This would cause either or both of the discriminators 66 and 68 to transmit a signal or signals to inactivate the inflating system.

On the other hand, when there is initial combustion of the fuel-air mixture (as at 16), there is a time lag generally greater than 0.15 seconds before this initial combustion becomes a rapidly propagating combustion reaction (as at 18) adequate to register either a static pressure or a dynamic pressure above the predetermined threshold levels. In such a circumstance, the pressure discriminators 66 and 68 would determine a situation of no increase above the threshold level within the initial time period and would send an arming signal to the discriminating and activating apparatus 62. This arming signal would, in effect, indicate to the apparatus 62 that ultraviolet radiation has been detected which is not resulting from a deliberately set explosion, but which may be from an initial combustion reaction of a fuel-air mixture. The task of the discriminating and activating means 62 is to determine incipient rapid propagation of the combustion reaction down the shaft 14 and activate the several barrier stations 20. The discriminating and activating means 62 accomplishes this by responding to any one of the following five inputs:

a. the discriminator 70 determining an increase in static pressure above a predetermined level (e.g. 1.5 psi), b. the discriminator 72 determining an increase in dynamic pressure above a predetermined threshold level (e.g. a dynamic pressure corresponding to an air velocity of 100 feet per second), c. the ultraviolet discriminator 74 sensing a rate of increase of ultraviolet light above a predetermined level, d. the discriminator 76 sensing a rate of change of static pressure above a predetermined threshold level (e.g. 20 psi per second), and e. the discriminator 78 sensing an increase in rate of change of air velocity above a predetermined threshold level (e.g. 1,000 feet per second per second).

If any one of the above five discriminators 70 through 78 transmits a yes signal, the several barrier stations 20 are activated to cause the barrier bags 28 to become inflated and block the passageway 14 with a contained combustion suppressing agent. On the other hand, if none of the discriminators 70 through 78 becomes activated, this would indicate that the initial ultraviolet light was initiated from a source other than a fuel-air combustion reaction that was propagating into a rapidly traveling combustion reaction, and accordingly the suppressor stations 20 would not be activated. Upon activation, the barrier bags 28 become inflated to their positions blocking the passageway 14. The combustion suppressing medium vaporized and/or atomized in the bags 28 becomes exposed to the combustion reaction when the bags 28 deteriorate in the face of the advancing combustion reaction, thus causing suppression of the combustion reaction.

What is claimed is:

1. In a location, such as a coal mine, where there is susceptibility to a propagating explosive-like reaction along a confined path, apparatus to suppress propagation of said reaction, said apparatus comprising:
  a. detecting means disposed relative to said location to detect a situation of at least possible propagation of an explosive-like reaction along said path,
  b. inflatable barrier bag means located proximate said path and having a collapsed position blocking the propagating path of said reaction and an inflated position with an outer surface of said bag means exposed to said reaction, and
  c. inflating means operatively connected to said detecting means so as to be responsive to said detecting means and arranged to inflate the bag means to its inflated position within a time period sufficient to block propagation of said reaction.

2. The apparatus as recited in claim 1, wherein said inflating means comprises an inflating medium comprising reaction suppressing matter.

3. The apparatus as recited in claim 2, wherein said bag means comprises a bag surface material that is deteriorable, whereby said reaction suppressing matter becomes exposed to said reaction upon deterioration of said surface material.

4. The apparatus as recited in claim 3, wherein said bag surface material is a heat deteriorable material which experiences deterioration from heat of said reaction.

5. The apparatus as recited in claim 1, wherein said inflating means comprises fire suppressing matter and means to distribute said fire suppressing matter in said bag means.

6. The apparatus as recited in claim 5, wherein said fire suppressing matter is atomizable or vaporizable matter and said distributing means comprises means to atomize or vaporize said matter in said bag means.

7. In a location, such as a coal mine, where there is susceptibility to a propagating explosive-like reaction along a confined path, a method of suppressing propagation of said reaction, said method comprising:
  a. detecting a situation of at least possible propagation of said reaction, and
  b. inflating an inflatable barrier bag means to a position blocking the propagating path of said reaction with an outer surface of said bag means exposed to said reaction in said path and within a time period sufficient to cause suppression of propagation of said reaction.

8. The method as recited in claim 7, further comprising inflating said inflatable bag means with an inflating medium comprising reaction suppressing matter.

9. The method as recited in claim 8, further characterized in deploying as bag surface material a deteriorable material, whereby said reaction suppressing matter becomes exposed to said reaction upon deterioration of said surface material.

10. The method as recited in claim 9, further characterized in deploying a bag surface material that is heat deteriorable so that said reaction suppressing matter becomes exposed upon deterioration of said surface material from heat of said reaction.

11. The method as recited in claim 7, further comprising distributing in said bag means fire suppressing matter.

12. The method as recited in claim 11, wherein said distributing is accomplished by atomizing or vaporizing said fire suppressing matter in said bag means.

13. In a relatively confined location, such as a coal mine, where a fuel material, such as coal dust, is susceptible to being mixed with air in said location such that there is a possibility of a combustion reaction of a fuel-air mixture and subsequent propagation of said combustion along a path, apparatus to detect a situation of such combustion and incipient propagation of such combustion, said apparatus comprising:
   a. first sensing means to sense combustion radiation at said location,
   b. second sensing means to sense air pressure at said location,
   c. third discriminating means responsive to said first and second means to determine a condition of combustion radiation combined with pressure below a predetermined level within a predetermined time period after initial combustion radiation,
   d. fourth activating means responsive to said third means determining said condition and further responsive to a predetermined increase at said location of at least one of static air pressure, dynamic air pressure, rate of change of combustion radiation, rate of change of static pressure, or rate of change of dynamic air pressure, whereby propagation of said combustion is detected, and
   e. confinement barrier means containing combustion suppressing means and being operatively connected to said fourth activating means in a manner to be activated by said fourth activating means to be deployed in a position blocking the propagating path of said reaction.

14. In a relatively confined location, such as a coal mine, where a fuel material, such as coal dust, is susceptible to being mixed with air in said location such that there is a possibility of a combustion reaction of a fuel-air mixture and subsequent propagation of said combustion, a method to detect a situation of such combustion and incipient propagation of such combustion, said method comprising:
   a. sensing combustion radiation at said location,
   b. sensing air pressure at said location,
   c. determining a condition of combustion radiation and air pressure below a predetermined level within a predetermined time period after initial combustion radiation.
   d. after determining said condition, sensing an increase at said location in at least one of static air pressure, dynamic air pressure, rate of change of combustion radiation, rate of change of static air pressure, or rate of change of dynamic air pressure, and
   e. initiating combustion suppression means in response to sensing said predetermined increase after determining said condition.

15. In a location, such as a coal mine, where there is susceptibility to a propagating explosive-like reaction along a confined path, apparatus to suppress propagation of said reaction, said apparatus comprising:
   a. inflatable barrier bag means located proximate said path and having a collapsed position and an inflated position blocking the propagating path of said reaction with an outer surface of said bag means exposed to said reaction, and
   b. inflating means arranged to inflate the bag means to its inflated position within a time period sufficient to block propagation of said reaction.

16. The apparatus as recited in claim 15, wherein said inflating means comprises an inflating medium comprising reaction suppressing matter.

17. The apparatus as recited in claim 16, wherein said bag means comprises a bag surface material that is deteriorable, whereby said reaction suppressing matter becomes exposed to said reaction upon deterioration of said surface material.

18. The apparatus as recited in claim 17, wherein said bag surface material is a heat deteriorable material which experiences deterioration from heat of said reaction.

19. The apparatus as recited in claim 15, wherein said inflating means comprises fire suppressing matter and means to distribute said fire suppressing matter in said bag means.

20. The apparatus as recited in claim 19, wherein said fire suppressing matter is atomizable or vaporizable matter and said distributing means comprises means to atomize or vaporize said matter in said bag means.

* * * * *